(12) United States Patent
Ohyama (10) Patent No.: US 11,288,554 B2
(45) Date of Patent: Mar. 29, 2022

(54) DETERMINATION METHOD AND DETERMINATION DEVICE

(71) Applicant: Panasonic Intellectual Property Corporation of America, Torrance, CA (US)

(72) Inventor: Shinji Ohyama, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 63 days.

(21) Appl. No.: 17/022,524

(22) Filed: Sep. 16, 2020

(65) Prior Publication Data

US 2020/0410305 A1    Dec. 31, 2020

Related U.S. Application Data

(63) Continuation of application No. PCT/JP2019/031586, filed on Aug. 9, 2019.

(30) Foreign Application Priority Data

Sep. 14, 2018  (JP) .............................. JP2018-172345

(51) Int. Cl.
  *G06K 9/68*    (2006.01)
  *G05D 1/02*    (2020.01)
  (Continued)

(52) U.S. Cl.
  CPC ........... *G06K 9/685* (2013.01); *G05D 1/0248* (2013.01); *G05D 1/0253* (2013.01);
  (Continued)

(58) Field of Classification Search
  CPC .... G06K 9/6211; G06K 9/685; G06K 9/3241; G06K 9/00805
  See application file for complete search history.

(56) References Cited

U.S. PATENT DOCUMENTS

| 2016/0063717 A1 | 3/2016 | Sasaki et al. |
| 2017/0067764 A1 | 3/2017 | Skupin et al. |
| 2018/0020207 A1* | 1/2018 | Sugimura ............ G01B 11/245 |

FOREIGN PATENT DOCUMENTS

JP    2017-78709    4/2017

OTHER PUBLICATIONS

International Search Report (ISR) dated Sep. 24, 2019 in International (PCT) Application No. PCT/JP2019/031586.

(Continued)

*Primary Examiner* — Sam Bhattacharya
(74) *Attorney, Agent, or Firm* — Wenderoth, Lind & Ponack, L.L.P.

(57)    ABSTRACT

A determination method includes: obtaining first information indicating positions and shapes of one or more objects detected by a first detection device, and second information indicating positions and shapes of one or more objects detected by a second detection device determined in advance as a reference detection device; extracting a reference object that is a common object from the one or more objects detected by the first detection device and the one or more objects detected by the second detection device based on the first information and the second information, the common object being detected by the detection devices with a time difference within a predetermined range; comparing a position of the reference object indicated by the first information to the position of the reference object indicated by the second information; and determining whether the first detection device is operating normally.

16 Claims, 8 Drawing Sheets

(51) Int. Cl.
*G06K 9/00* (2022.01)
*G06K 9/32* (2006.01)
*G06K 9/62* (2022.01)

(52) U.S. Cl.
CPC ....... *G06K 9/00805* (2013.01); *G06K 9/3241* (2013.01); *G06K 9/6211* (2013.01)

(56) References Cited

OTHER PUBLICATIONS

Extended European Search Report dated Oct. 8, 2021 in corresponding European Patent Application No. 19859231.3.

* cited by examiner

DETERMINATION METHOD AND DETERMINATION DEVICE

CROSS REFERENCE TO RELATED APPLICATIONS

This application is a U.S. continuation application of PCT International Patent Application Number PCT/JP2019/031586 filed on Aug. 9, 2019, claiming the benefit of priority of Japanese Patent Application Number 2018-172345 filed on Sep. 14, 2018, the entire contents of which are hereby incorporated by reference.

BACKGROUND

1. Technical Field

The present disclosure relates to a determination method and a determination device for determining whether a detection device is operating normally.

2. Description of the Related Art

A technique of performing processing based on results of detection by a detection device is known (see, e.g., Japanese Unexamined Patent Application Publication No. 2017-78709).

SUMMARY

While not operating normally, a detection device may output erroneous detection results.

To address the problem, it is an objective of the present disclosure to provide a determination method and a determination device for determining whether a detection device is operating normally.

A determination method according to an aspect of the present disclosure includes: obtaining first information indicating positions and shapes of one or more objects detected by a first detection device, and second information indicating positions and shapes of one or more objects detected by a second detection device determined in advance as a reference detection device; extracting a reference object that is a common object from the one or more objects detected by the first detection device and the one or more objects detected by the second detection device based on the first information and the second information, the common object being detected by the first detection device and the second detection device with a time difference within a predetermined range; comparing a position of the reference object indicated by the first information to the position of the reference object indicated by the second information; and determining whether the first detection device is operating normally.

A determination device according to an aspect of the present disclosure includes: an obtainer that obtains first information indicating positions and shapes of one or more objects detected by a first detection device, and second information indicating positions and shapes of one or more objects detected by a second detection device determined in advance as a reference detection device; an extractor that extracts a reference object that is a common object from the one or more objects detected by the first detection device and the one or more objects detected by the second detection device based on the first information and the second information, the common object being detected by the first detection device and the second detection device with a time difference within a predetermined range; and a comparator that compares a position of the reference object indicated by the first information to the position of the reference object indicated by the second information to determine whether the first detection device is operating normally.

The determination method and the determination device according to the aspect of the present disclosure allows determination on whether the detection device is operating normally.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Circumstances Leading to an Aspect of the Present Disclosure

In recent years, moving bodies that drive autonomously (e.g., autonomous vehicles) have been developed.

In general, a detection device that detects the positions of surrounding objects is mounted on a moving body that drives autonomously. If the detection device is not operating normally in the moving body that drives autonomously, the moving body may cause an accident. It is thus important to check whether the detection device is operating normally which is mounted on the moving body driving autonomously and detects the positions of the surrounding objects.

In this point of view, the inventor has conceived of a determination method and a determination device according to an aspect of the present disclosure to check weather a detection device is operating normally which detects the positions of objects.

A determination method according to an aspect of the present disclosure includes: obtaining first information indicating positions and shapes of one or more objects detected by a first detection device, and second information indicating positions and shapes of one or more objects detected by a second detection device determined in advance as a reference detection device; extracting a reference object that is a common object from the one or more objects detected by the first detection device and the one or more objects detected by the second detection device based on the first information and the second information, the common object being detected by the first detection device and the second detection device with a time difference within a predetermined range; comparing a position of the reference object indicated by the first information to the position of the reference object indicated by the second information; and determining whether the first detection device is operating normally.

In the determination method, the positions of the reference objects are detected by the first detection device and the second detection device with the time difference within the predetermined range. The second detection device is determined in advance as the reference detection device. Accordingly, the determination method allows determination on whether the first detection device is operating normally.

The first detection device may be mounted on a moving body. In the extracting of the reference object, the reference object may be extracted from the one or more objects detected, by the first detection device, when the moving body moves at a first predetermined speed or lower. The first detection device may be mounted on a moving body. In the extracting of the reference object, the reference object may be extracted from the one or more objects detected, by the first detection device, when the moving body is stopped. In the extracting of the reference object, a stationary object may be extracted as the reference object. In the extracting of the reference object, an object moving at a second predetermined speed or lower may be extracted as the reference object. In the extracting of the reference object, one or more objects in a predetermined shape may be extracted as reference objects each being the reference object. The one or more objects in the predetermined shape may be long objects.

These configurations allow more accurate determination on whether the first detection device is operating normally.

The first detection device may be mounted on a moving body. In the determining, when it is determined that the first detection device is not operating normally, a signal for stopping the moving body may be output.

This configuration allows a reduce in the frequency of accidents of the moving body caused by the fact that the first detection device mounted on the moving body is not operating normally.

In the determining, when it is determined that the first detection device is not operating normally, a signal for starting calibration related to the first detection device may be output.

With this configuration, if the first detection device is not operating normally, the calibration of the first detection device starts.

The method may further include: repeatedly extracting the reference object; registering, in a database a position of each of the one or more reference objects extracted; and calculating a reliability of each of the one or more reference objects registered in the database, based on at least one of a frequency of extraction of the reference object and a location of another reference object near the reference object.

This configuration applies the reliabilities to the result of the determination on whether the first detection device is operating normally.

The method may further include: repeatedly extracting the reference object; obtaining, from a dynamic map, third information indicating whether each of the one or more reference objects extracted is a static object or a quasi-static object, and linking the reference object with the third information; and calculating a reliability of each of the one or more reference objects extracted such that a reference object indicated as being the static object or the quasi-static object by the third information linked has a higher reliability than a reference object indicated as being neither the static object nor the quasistatic object by the third information linked.

This configuration allows more accurate calculation of the reliabilities of the reference objects.

The first detection device may be mounted on a moving body. In the determining, when it is determined that the first detection device is not operating normally, any one of a signal for leaving an alert in the moving body, a signal for maintaining the moving body, and a signal for stopping the moving body may be selectively output in accordance with the reliability of the reference object utilized for the determination.

With this configuration, when it is determined that the first detection device mounted on the moving body is not operating normally, how to handle the moving body can be changed in accordance with the reliabilities of the reference objects.

The first detection device may be mounted on a moving body. A signal may be output which is for causing the moving body to travel periodically in an area including a reference object having a reliability higher than a predetermined value.

This configuration allows periodic determination on whether the first detection device mounted on the moving body is operating normally.

A determination device according to an aspect of the present disclosure includes: an obtainer that obtains first information indicating positions and shapes of one or more objects detected by a first detection device, and second information indicating positions and shapes of one or more objects detected by a second detection device determined in advance as a reference detection device; an extractor that extracts a reference object that is a common object from the one or more objects detected by the first detection device and the one or more objects detected by the second detection device based on the first information and the second information, the common object being detected by the first detection device and the second detection device with a time difference within a predetermined range; and a comparator that compares a position of the reference object indicated by the first information to the position of the reference object indicated by the second information to determine whether the first detection device is operating normally.

In the determination device, the positions of the reference objects detected by the first detection device and the second detection device with the time difference within the predetermined range. The second detection device is determined in advance as the reference detection device. Accordingly, the determination device allows the determination on whether the first detection device is operating normally.

Now, a specific example of a determination method and a determination device according to an aspect of the present disclosure will be described with reference to the drawings. The embodiment described here is a mere specific example of the present disclosure. The numerical values, shapes, constituent elements, the arrangement and connection of the constituent elements, steps, step orders etc. shown in the following embodiment are thus mere examples, and are not intended to limit the scope of the present disclosure. Among the constituent elements in the following embodiment, those not recited in any of the independent claims are described as optional constituent elements. In addition, the figures are schematic representations and not necessarily drawn strictly to scale.

EMBODIMENT

Now, an example determination system according to an aspect of the present disclosure will be described. This determination system compares the position of an object detected by a first detection device to the position of the same object detected by the second detection device to determine whether the first detection device is operating normally. The first detection device may not be calibrated accurately, whereas the second detection device has been calibrated accurately and determined in advance as a reference detection device.

1. Configuration

Figure 1:
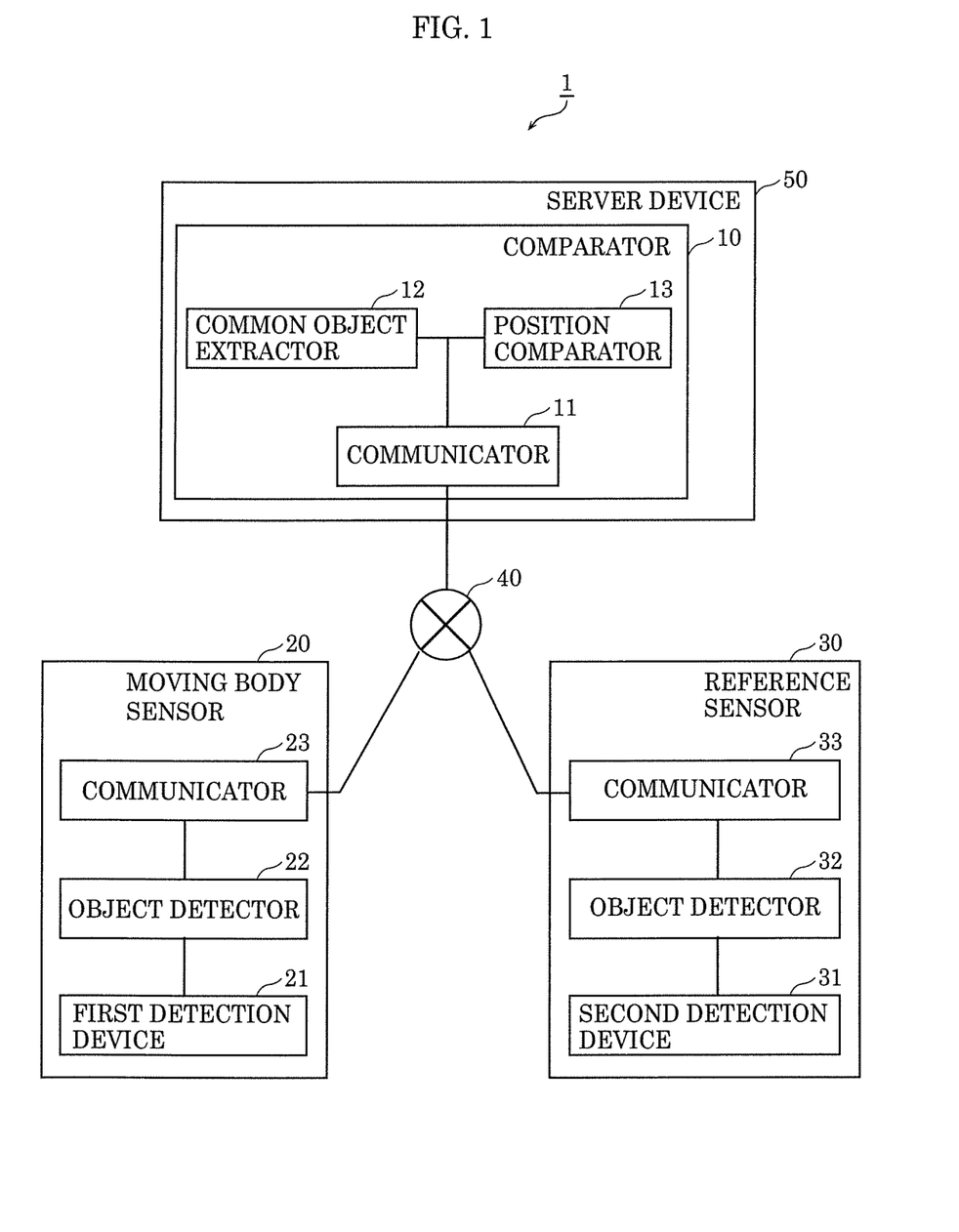
FIG. 1 is a block diagram showing a configuration of a determination system according to an embodiment.

FIG. 1 is a block diagram showing a configuration of determination system 1 according to an aspect of the present disclosure.

As shown in FIG. 1, determination system 1 includes moving body sensor 20, reference sensor 30, network 40, and server device 50.

Moving body sensor 20 includes first detection device 21, object detector 22, and communicator 23. In determination system 1, moving body sensor 20 is, for use, mounted on a moving body, for example. The moving body mounted with moving body sensor 20 may be, for example, an autonomous vehicle that drives autonomously in a shopping mall. The following description assumes that moving body sensor 20 is mounted on an autonomous vehicle that drives autonomously in a shopping mall. However, the moving body mounted with moving body sensor 20 is not necessarily limited to an autonomous vehicle. Moving body sensor 20 may be placed not in a moving body but in infrastructure equipment such as a building.

First detection device 21 detects the positions and shapes of objects. First detection device 21 is a laser imaging detection and ranging (LiDAR) or a stereo camera, for example. The following description assumes that first detection device 21 is a LiDAR but the first detection device is not necessarily limited to a LiDAR. If first detection device 21 is a LiDAR, first detection device 21 outputs, as results of detecting the positions and shapes of objects, point cloud data indicating the positions of spots irradiated with laser light.

Figure 2:
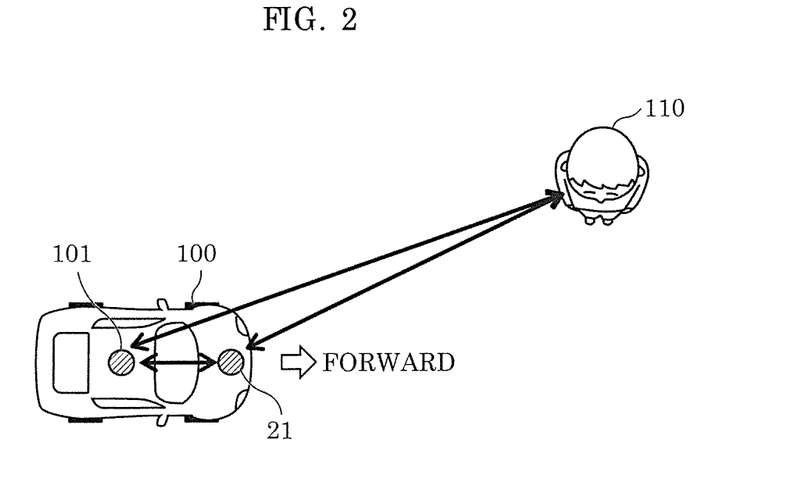
FIG. 2 is a schematic view showing that a first detection device according to the embodiment is mounted on a moving body.

FIG. 2 is a schematic view showing that first detection device 21 is mounted on autonomous vehicle 100 that is an example moving body.

As shown in FIG. 2, first detection device 21 is mounted, for example, at the front (e.g., at the bumper) of autonomous vehicle 100 in the forward direction and detects the positions and shapes of objects around autonomous vehicle 100. As shown in FIG. 2, first detection device 21 detects, for example, the position and shape of person 110 diagonally in front of autonomous vehicle 100.

In addition to moving body sensor 20, autonomous vehicle 100 further includes a storage device (not shown) that stores the map of a travel area, and a position obtaining means (not shown) that obtains the position of the own vehicle. The vehicle drives autonomously based on the map of the travel area, the position of the own vehicle, and the positions of the objects around autonomous vehicle 100 detected by first detection device 21. The position obtaining means may include, for example, a device that obtains the position of the own device utilizing a global positioning system (GPS), a device that estimates the position of the own device utilizing dead reckoning, and a device that estimates the position of the own device utilizing the normal distributions transform (NDT).

When first detection device 21 is mounted on autonomous vehicle 100, the mounting position and mounting angle, for example, of first detection device 21 are calibrated accurately. Unless being calibrated accurately, first detection device 21 cannot operating normally. The mounting position is calibrated to, for example, a relative coordinate from center 101 of the vehicle, whereas the mounting angle is calibrated to, for example, a yaw angle with respect to the forward direction. However, with a lapse of time after the last calibration, the mounting position and mounting angle, for example, of first detection device 21 may deviate from the accurately calibrated position and angle. Assume that the mounting position and mounting angle, for example, of first detection device 21 deviate from the accurately calibrated position and angle. In this case, autonomous vehicle 100 may determine that an object detected by first detection device 21 is present in a position at a distance or in a direction, which is different from the actual distance or direction, from center 101 of the vehicle, and drive autonomously. For example, if the mounting yaw angle of first detection device 21 deviates from the accurately calibrated angle by 1 degree, the position of an object detected 50 m ahead deviates from the actual position by 87 cm. In this manner, checking whether first detection device 21 is calibrated accurately is important in the autonomous driving by autonomous vehicle 100. In particular, checking whether the mounting yaw angle of first detection device 21 is calibrated accurately is important.

Referring back to FIG. 1, the description of the configuration of determination system 1 will be continued.

Object detector 22 calculates first information indicating the positions and shapes of one or more objects detected by first detection device 21 based on a result of detection by first detection device 21. Object detector 22 performs object selection, for example, to calculate the first information. This object selection will be described with reference to the drawings. Moving body sensor 20 includes a processor (not shown) and a memory (not shown), for example. Object detector 22 is achieved by, for example, the processor executing the programs stored in the memory.

Communicator 23 communicates with other equipment connected to network 40. The other equipment includes server device 50. Communicator 23 may include a wireless communication device, for example, to communicate wirelessly with the other equipment connected to network 40.

Reference sensor 30 includes second detection device 31, object detector 32, and communicator 33. In determination system 1, reference sensor 30 is, for use, placed on infrastructure equipment, for example. The following description assumes that reference sensor 30 is placed on the outer wall of a building in a shopping mall. However, the infrastructure equipment mounted with reference sensor 30 is not necessarily limited to a building. Alternatively, reference sensor 30 may be mounted not on infrastructure equipment but in a patrol vehicle. The patrol vehicle patrols the inside of a shopping mall using second detection device 31, which will be described later, operating after being certainly accurately calibrated.

Like first detection device 21, second detection device 31 detects the positions and shapes of objects. Second detection device 31 is a LiDAR or a stereo camera, for example. The following description assumes that second detection device 31 is a LiDAR like first detection device 21 but the second detection device is not necessarily limited to a LiDAR. If second detection device 31 is a LiDAR, second detection device 31 outputs, as results of detecting the positions and shapes of objects, point cloud data indicating the positions of spots irradiated with laser light.

Unlike first detection device 21, second detection device 31 operates after being certainly accurately calibrated. That is, second detection device 31 always detects the accurate positions of objects. Second detection device 31 is thus determined in advance as a reference detection device.

Object detector 32 calculates second information indicating the positions and shapes of one or more objects detected by second detection device 31 based on results of detection by second detection device 31. Like first detection device 21, object detector 32 performs object selection, for example, to calculate the second information. Reference sensor 30 includes a processor (not shown) and a memory (not shown), for example. Object detector 32 is achieved by the processor executing the programs stored in the memory.

Communicator 33 communicates with other equipment connected to network 40. The other equipment includes server device 50. Communicator 33 may include a wireless communication device, for example, to communicate wireless with the other equipment connected to network 40.

Server device 50 is a computer device with a communication function, for example, a personal computer (PC) or an information processing terminal. Server device 50 may be a single PC, for example, or a plurality of PCs that are communicative with each other and perform distributed processing. Server device 50 includes a processor (not shown) and a memory (not shown), for example. Comparator 10 is achieved by the processor executing the programs stored in the memory.

Comparator 10 includes communicator 11, common object extractor 12, and position comparator 13.

Communicator 11 communicates with other equipment connected to network 40. The other equipment includes moving body sensor 20 and reference sensor 30. Communicator 11 may include a wireless communication device, for example, to communicate wireless with the other equipment connected to network 40.

Communicator 11 communicates with moving body sensor 20 to obtain the first information from moving body sensor 20, and communicates with reference sensor 30 to obtain the second information from reference sensor 30.

Based on the first information and the second information obtained by communicator 11, common object extractor 12 extracts a reference object that is a common object from one or more objects detected by first detection device 21 and one or more objects detected by second detection device 31. The common object is detected by the detection devices (i.e., first detection device 21 and second detection device 31) with a time difference within a predetermined range. Common object extractor 12 may extract the reference object from the objects in the same shape based on, for example, the shapes of the one or more objects detected by first detection device 21 and the shapes of the one or more objects detected by second detection device 31. Alternatively, common object extractor 12 may extract the reference object from objects with the same relative positional relationship with another object based on, for example, the relative positional relationships of the one or more objects detected by first detection device 21 with the other object and the relative positional relationships of the one or more objects detected by second detection device 31 with the other object.

Position comparator 13 compares the position of the reference object indicated by the first information and extracted by common object extractor 12 to the position of the reference object indicated by the second information and extracted by common object extractor 12. The position comparator then determines whether first detection device 21 is operating normally.

2. Operation

Now, an operation of determination system 1 with the configuration described above will be described.

Figure 3:
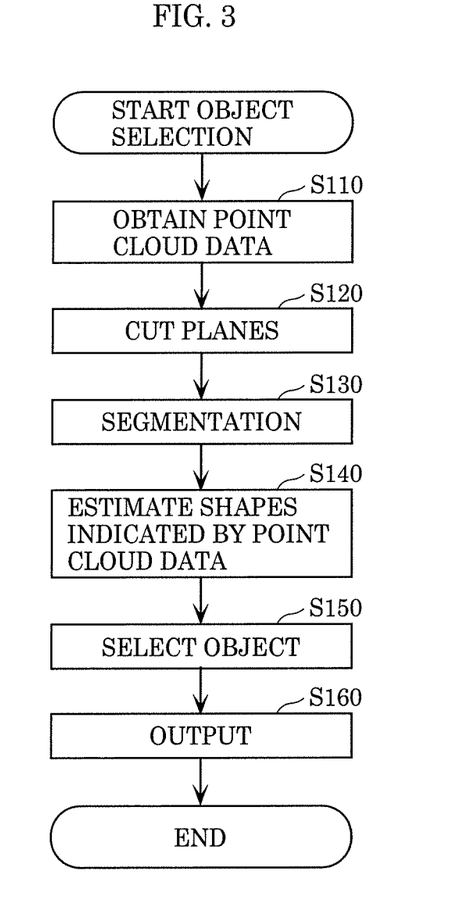
FIG. 3 is a flowchart of object selection according to the embodiment.
Figure 6:
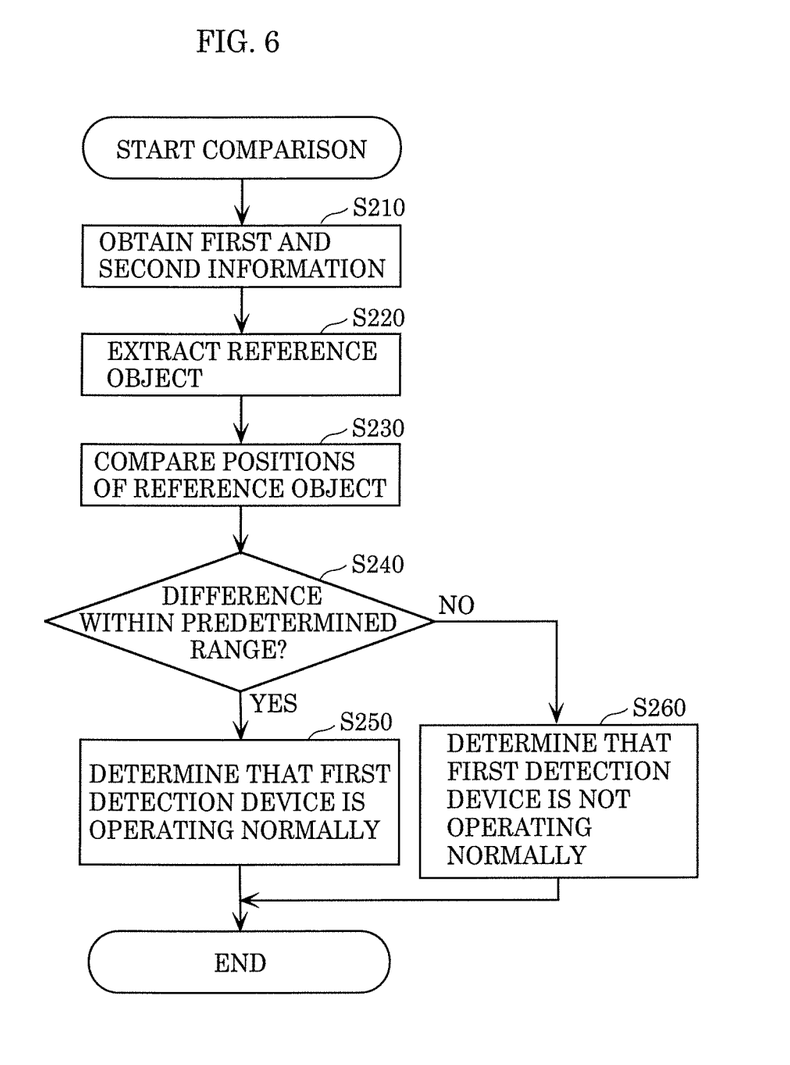
FIG. 6 is a flowchart of determination according to the embodiment.

The operation of determination system 1 includes object selection mainly performed by object detector 22 and object detector 32 and comparison processing mainly performed by comparator 10.

Now, the object selection and determination will be described sequentially.

FIG. 3 is a flowchart of the object selection. The following description assumes that object detector 32 mainly performs the object selection to calculate the second information. The same applies where object detector 22 mainly performs the object selection to calculate the first information.

The object selection may start repeatedly, for example, at a time interval determined in advance or may start once reference sensor 30 receives a signal indicating the start of the object selection from comparator 10. Alternatively, the object selection may start once reference sensor 30 receives an instruction indicating the start of the object selection from the user utilizing reference sensor 30 or may start upon reaching a predetermined time.

Once the object selection starts, object detector 32 obtains point cloud data indicating the positions and shapes of the objects detected by second detection device 31 (step S110).

Figure 4A:
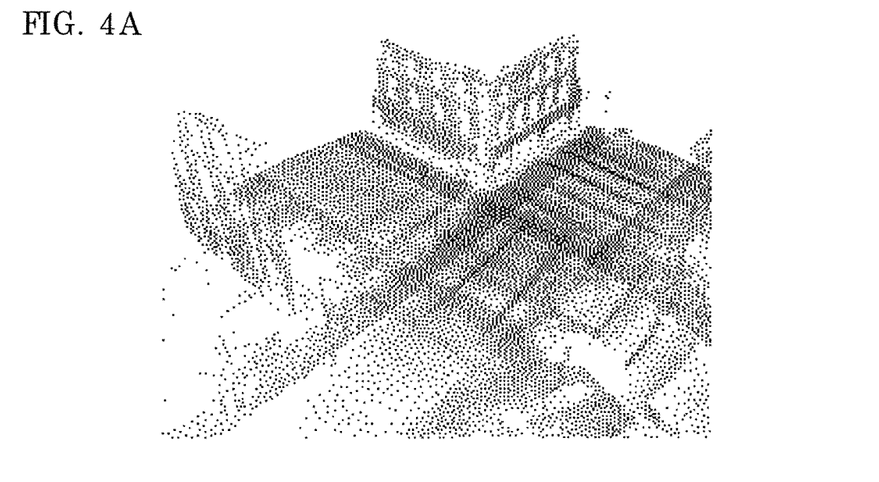
FIG. 4A is a schematic view showing example point cloud data.

FIG. 4A is a schematic view showing example point cloud data indicating the positions and shapes of objects output as results of detection from second detection device 31.

The points of the point clouds shown in FIG. 4A represent the positions of spots irradiated with laser light by second detection device 31 that is a LiDAR.

Referring back to FIG. 3, the description of the object selection will be continued.

Upon obtaining the point cloud data, object detector 32 cuts the point clouds representing planes from the point cloud data detected by second detection device 31 (step S120). More specifically, object detector 32 deletes, from the point cloud data detected by second detection device 31, the point cloud in the area including points whose normal vectors have a smaller variation. The point cloud data obtained by deleting, from the point cloud data detected by second detection device 31, the point cloud in the area including the points whose normal vectors have a smaller variation will also be hereinafter referred to as "plane-deleted point cloud data".

In general, planes are, as objects, in shapes less characteristic for accurately comparing positions. Therefore, object detector 32 performs the processing in step S120 to exclude planes from the targets whose positions are compared.

Figure 4B:
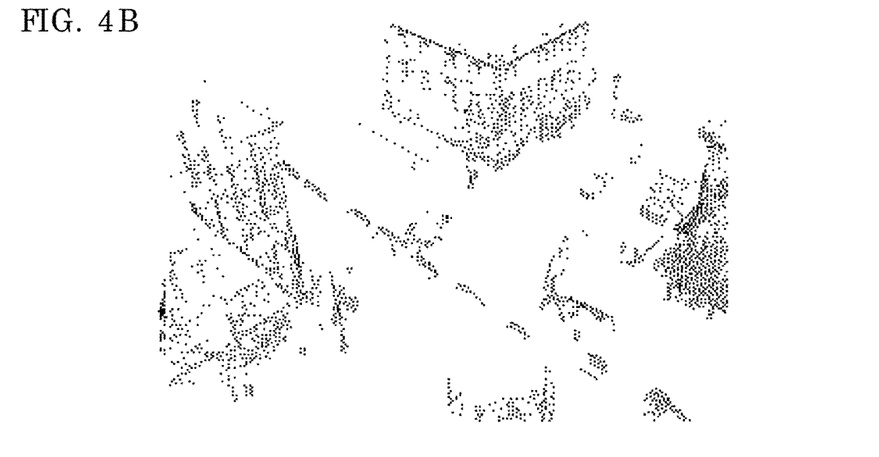
FIG. 4B is a schematic view showing example plane-deleted point cloud data obtained by deleting point clouds corresponding to planes.

FIG. 4B is a schematic view showing example plane-deleted point cloud data.

As shown in FIG. 4B, the plane-deleted point cloud data is obtained by deleting point clouds corresponding to planes such as the ground or walls from the point cloud data detected by second detection device 31.

Referring back to FIG. 3, the description of the object selection will be continued.

Upon cutting the point cloud data representing the planes, object detector 32 performs segmentation of the plane-deleted point cloud data (step S130). More specifically, object detector 32 divides the point clouds in the plane-deleted point cloud data into groups of point clouds including adjacent point clouds, and labels the divided groups of point clouds.

Figure 4C:
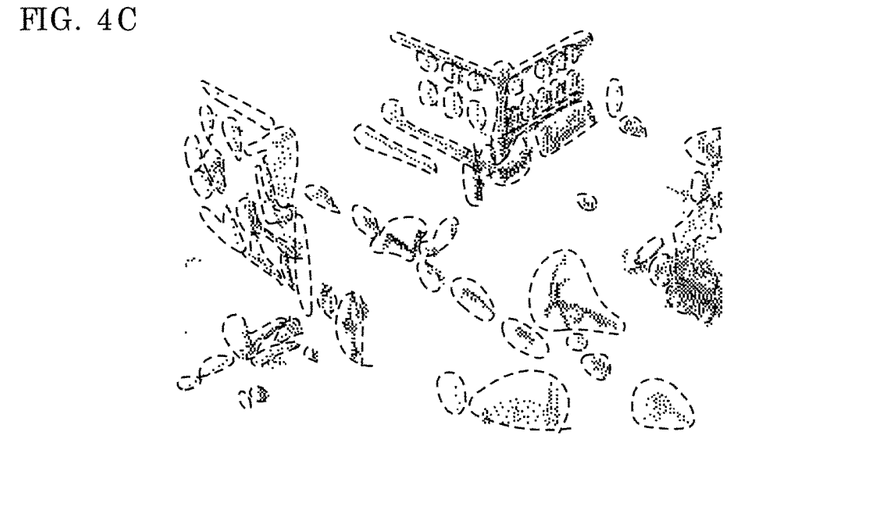
FIG. 4C is a schematic view showing example plane-deleted point cloud data divided into groups of point clouds.

FIG. 4C is a schematic view showing plane-deleted point cloud data that is divided into groups of point clouds.

In FIG. 4C, the groups of point clouds surrounded by broken lines are divided groups of point clouds.

As shown in FIG. 4C, the divided groups of point clouds correspond to objects in a real space. That is, the divided groups of point clouds represent the positions and shapes of the corresponding objects.

Referring back to FIG. 3, the description of the object selection will be continued.

After the processing in step S130, object detector 32 performs processing (i.e., the processing in steps S140 to S150 which will be described later) for selecting, out of the objects corresponding to the divided groups of point clouds, an object in a shape suitable as a target whose positions are compared. An example is described here where a bar-like object is suitable as the target whose positions are compared. This is because a bar-like object is suitable as the target whose positions are compared to accurately check whether the mounting yaw angle of first detection device 21 is accurately calibrated. However, the object suitable as the target whose positions are compared is not necessarily limited to a bar-like object. If an object meeting other requirements is suitable as the target whose positions are compared, the processing in steps S140 to S150 described later may be replaced with processing for selecting the object meeting the requirements. Alternatively, if there is no or little need to select an object suitable as the target whose positions are compared, the processing in steps S140 to S150 described later may be omitted.

After the processing in step S130, object detector 32 estimates the shapes of the objects indicated by the point cloud data, for the divided groups of point clouds (step S140). More specifically, object detector 32 performs first processing of performing eigenvalue decomposition by calculating three eigenvalues of the covariance matrix in the three-dimensional space for each divided group of point clouds. Object detector 32 then performs second processing of comparing the three calculated eigenvalues.

Figure 5A:
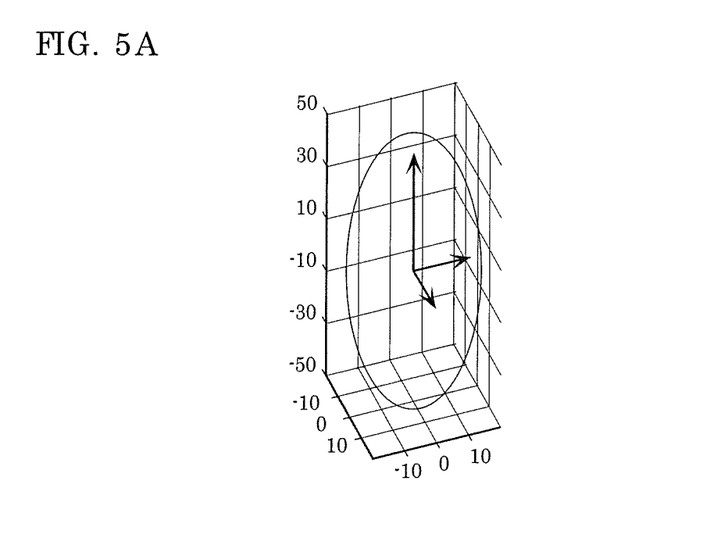
FIG. 5A is a schematic view showing an example relationship between the shape of a divided group of point clouds and three eigenvalues.
Figure 5B:
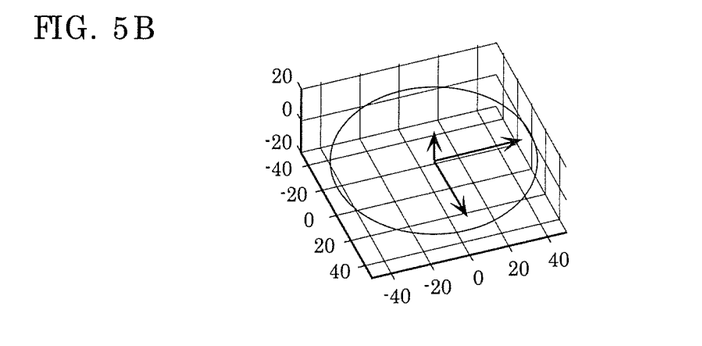
FIG. 5B is a schematic view showing another example relationship between the shape of a divided group of point clouds and three eigenvalues.
Figure 5C:
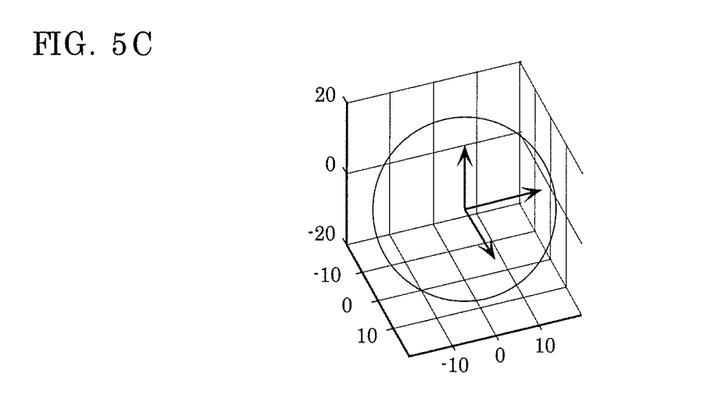
FIG. 5C is a schematic view showing further another example relationship between the shape of a divided group of point clouds and three eigenvalues.

Each of FIGS. 5A, 5B, and 5C is a schematic view showing an example relationship between the shape of a divided group of point clouds and three calculated eigenvalues.

As shown in FIG. 5A, if a divided group of point clouds is like a bar, three eigenvalues a, b, and c satisfy the relationship of $a>b\approx c$. As shown in, FIG. 5B, if a divided group of point clouds is like a plane, a, b, and c satisfy the relationship of $a\approx b>c$. As shown in FIG. 5C, a divided group of point clouds is like a sphere, a, b, and c satisfy the relationship of $a\approx b\approx c$. In this manner, the comparison among the three eigenvalues allows check whether the object corresponding to the divided group of point clouds is like a bar, a plane, or a sphere.

Referring back to FIG. 3, the description of the object selection will be continued.

Upon comparison of the three calculated eigenvalues, object detector 32 selects, out of the objects corresponding to divided groups of point clouds, the object in a shape (here a bar-like object) suitable as the target whose positions are compared based on the result of comparison (step S150). More specifically, object detector 32 retains, out of the plane-delated point cloud data, the divided group(s) of point clouds whose three eigenvalues a, b, and c satisfy the relationship of $a>b\approx c$ and deletes the other group(s) of point clouds.

After the object selection, object detector 32 retains, out of the plane-deleted point cloud data, the divided group(s) of point clouds whose three eigenvalues a, b, and c satisfy the relationship of $a>b\approx c$, and outputs, as the second information, the data obtained by deleting the other group(s) of point clouds (step S160). That is, object detector 32 sends the second information via communicator 33 to comparator 10.

Once the processing in step S160 ends, determination system 1 ends the object selection.

As specific example estimation of the shape indicated by point cloud data, the first processing and the second processing performed by object detector 32 have been described above. However, the first processing and the second processing performed by object detector 32 is a mere example of achieving the estimation of the shape indicated by the point cloud data. The estimation of the shape indicated by the point cloud data may be achieved by another method.

FIG. 6 is a flowchart of determination.

The determination may start, for example, once moving body sensor 20 sends the first information and reference sensor 30 sends the second information. Alternatively, the determination may start once comparator 10 receives an instruction indicating start of the determination from the user utilizing comparator 10 or may start upon reaching a predetermined time.

Once the determination starts, communicator 11 obtains the first information and the second information (step S210). The first information indicates the positions and shapes of the one or more objects detected by first detection device 21, whereas the second information indicates the positions and shapes of the one or more objects detected by second detection device 31. More specifically, communicator 11 receives the first information sent from moving body sensor 20 and the second information sent from reference sensor 30.

Once the first information and the second information are obtained, common object extractor 12 extracts a reference object that is a common object from the one or more objects detected by first detection device 21 and the one or more objects detected by second detection device 31 based on the first and second obtained information (step S220). The common object is detected by the detection devices (i.e., first detection device 21 and second detection device 31) with a time difference within a predetermined range.

Once the reference object has been extracted, position comparator 13 compares the position of the reference object indicated by the first information to the position of the reference object indicated by the second information (step S230).

In the processing in step S220, common object extractor 12 performs the extraction described above of one or more objects detected by first detection device 21 and second detection device 31 with the time difference within the predetermined range (e.g., 1 second). This extraction may be performed as follows. For example, object detector 22 calculates the first information including the information indicating the time of detection by first detection device 21.

Object detector 32 calculates the second information including the information indicating the time of detection by second detection device 31. Based on the information indicating the detected times included in the first information and the second information, common object extractor 12 performs the extraction described above using the combination of the first information and the second information detected with the time difference within the predetermined range. For example, the extraction may be performed by common object extractor 12 sending, via communicator 11 to moving body sensor 20 and reference sensor 30, a synchronization signal for causing first detection device 21 and second detection device 31 to perform the detection with the time difference within the predetermined range. For example, the extraction may be performed by first detection device 21 and second detection device 31 set in advance to perform the detection at times with the time difference within the predetermined range. This leads to more accurate comparison in the processing in step S230 between the position of the reference object indicated by the first information and the position of the reference object indicated by the second information.

In the processing in step S220, in extracting the reference object, common object extractor 12 may extract the reference object from the one or more objects detected by first detection device 21, for example, when the moving body mounted with first detection device 21 moves at a first predetermined speed (e.g., 10 km/s) or lower. This extraction may be performed as follows. For example, object detector 22 repeatedly calculates the first information at a time interval determined in advance. Common object extractor 12 compares the point cloud data indicated by the first information and newly obtained to the point cloud data indicated by the first information and previously obtained. It is then determined whether the moving body mounted with first detection device 21 moves at the first predetermined speed or lower. For example, the extraction may be performed by first detection device 21 set in advance to perform the detection only when the moving body mounted with the first detection device moves at the first predetermined speed or lower. This leads to more accurate comparison in the processing in step S230 between the position of the reference object indicated by the first information and the position of the reference object indicated by the second information.

In the processing in step S220, in extracting the reference object, common object extractor 12 may extract the reference object from the one or more objects detected by first detection device 21, for example, when the moving body mounted with first detection device 21 is stopped. This extraction may be performed as follows. For example, object detector 22 repeatedly calculates the first information at a time interval determined in advance. Common object extractor 12 compares the point cloud data indicated by the first information and newly obtained to the point cloud data indicated by the first information and previously obtained. It is then determined whether the moving body mounted with first detection device 21 is stopped. For example, the extraction may be performed by first detection device 21 is set in advance to perform the detection only when the moving body mounted with the first detection device is stopped. This leads to more accurate comparison in the processing in step S230 between the position of the reference object indicated by the first information and the position of the reference object indicated by the second information.

In the processing in step S220, in extracting the reference object, common object extractor 12 may extract, as the reference object, for example, an object moving at a second predetermined speed (e.g., 5 km/s) or lower. This extraction may be performed as follows. For example, object detector 22 repeatedly calculates the first information at a time interval determined in advance. Common object extractor 12 compares the point cloud data indicated by the first information and newly obtained to the point cloud data indicated by the first information and previously obtained. It is then determined whether the objects corresponding to the divided groups of point clouds move at the second predetermined speed or lower. For example, the extraction may be performed by moving body sensor 20 including a means for detecting the motions of objects, and object detector 22 selecting only the object(s) moving at the second predetermined speed or lower. This leads to more accurate comparison in the processing in step S230 between the position of the reference object indicated by the first information and the position of the reference object indicated by the second information.

In the processing in step S220, in extracting the reference object, common object extractor 12 may extract, as the reference object, for example, a stationary object. This extraction may be performed as follows. For example, object detector 22 repeatedly calculates the first information at a time interval determined in advance. Common object extractor 12 compares the point cloud data indicated by the first information and newly obtained to the point cloud data indicated by the first information and previously obtained. It is then determined whether the objects corresponding to the divided groups of point clouds are static. For example, the extraction may be performed by moving body sensor 20 including a means for detecting the motions of objects, and object detector 22 selecting only the stationary object(s). This leads to more accurate comparison in the processing in step S230 between the position of the reference object indicated by the first information and the position of the reference object indicated by the second information.

Once the processing in step S230 ends, position comparator 13 checks whether the difference between the position of the reference object indicated by the first information and the position of the reference object indicated by the second information falls within a predetermined range (step S240).

In the processing in step S240, if the difference falls within the predetermined range (i.e., Yes in step S240), position comparator 13 determines that first detection device 21 is operating normally (step S250).

In the processing in step S240, if the difference does not fall within the redetermined range (i.e., No in step S240), position comparator 13 determines that first detection device 21 is not operating normally (step S260).

In the processing in step S260, position comparator 13 may output a signal for stopping the moving body mounted with first detection device 21. In the processing in step S260, position comparator 13 may output a signal for starting the calibration related to first detection device 21.

Once the processing in step S250 ends or the processing in step S260 ends, determination system 1 ends the determination.

3. Studies

Determination system 1 described above compares the position of the object detected by first detection device 21 to the position of the same object detected by second detection device 31 to determine whether first detection device 21 is operating normally. First detection device 21 may not be calibrated accurately, whereas second detection device 31 has been calibrated accurately and determined in advance as the reference detection device. Accordingly, the user utilizing determination system 1 knows whether first detection device 21 is operating normally. In addition, determination system 1 described above utilizes the objects present originally within the range to be detected by first detection device 21 and second detection device 31 to compare the position of the object detected by first detection device 21 to the position of the same object detected by second detection device 31. There is thus no need to place an additional object to be compared in the comparison or to newly place a specific marker, for example, for specifying the objects to be compared in the comparison.

Remarks

The embodiment has been described above as an example technique disclosed in the present application. However, the technique of the present disclosure is not limited thereto and also applicable to embodiments in which modifications, substitutions, additions and omissions are made as appropriate.

Further example variations of the present disclosure will be listed below.

(1) The embodiment has been described where object detector 22 and object detector 32 mainly select objects in determination system 1. However, in determination system 1, as long as the object selection is executed, the configuration is not necessarily limited to the object selection mainly performed by object detector 22 and object detector 32. For example, comparator 10 may mainly perform the object selection. In this case, for example, moving body sensor 20 sends, as the first information, the point cloud data itself indicating the positions and shapes of the objects detected by first detection device 21 to comparator 10. Reference sensor 30 sends, as the second information, the point cloud data itself indicating the positions and shapes of the objects detected by second detection device 31 to comparator 10. Prior to the execution of the comparison, comparator 10 may execute the object selection for the first information and the object selection for the second information. The comparator may execute the comparison between the first information after executing the object selection and the second information after executing the object selection.

(2) The embodiment has been described where comparator 10 is included in server device 50 being a device independent from moving body sensor 20 and reference sensor 30 in determination system 1 as shown in FIG. 1. However, comparator 10 is not necessarily limited to the example configuration as the device independent from moving body sensor 20 and reference sensor 30.

Figure 7:
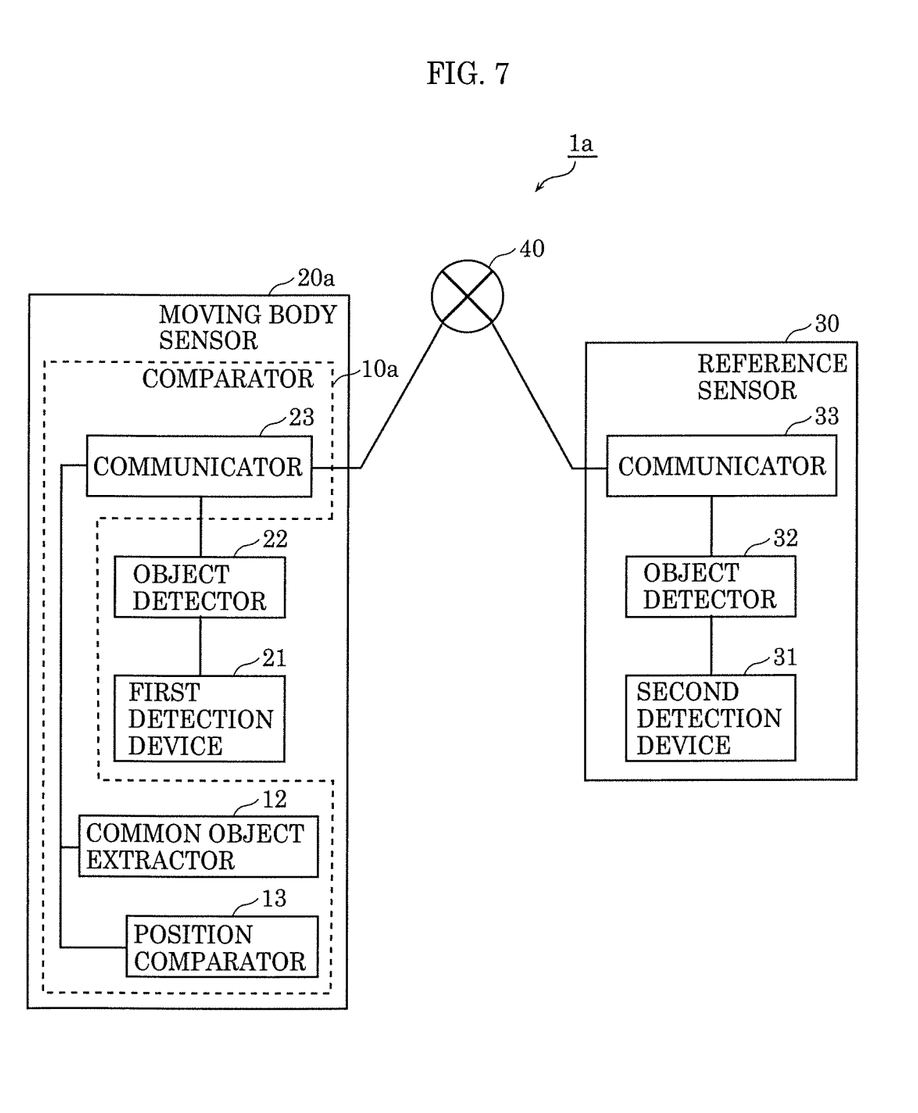
FIG. 7 is a block diagram showing a configuration of a determination system according to a variation.

As an example, as shown in FIG. 7, determination system 1a may include moving body sensor 20a, reference sensor 30, and network 40. Determination system 1a has the same or similar function as determination system 1 according to the embodiment. Moving body sensor 20a includes comparator 10a with the same or similar function as comparator 10 according to the embodiment. Moving body sensor 20a has the same or similar function as moving body sensor 20 according to the embodiment.

Figure 8:
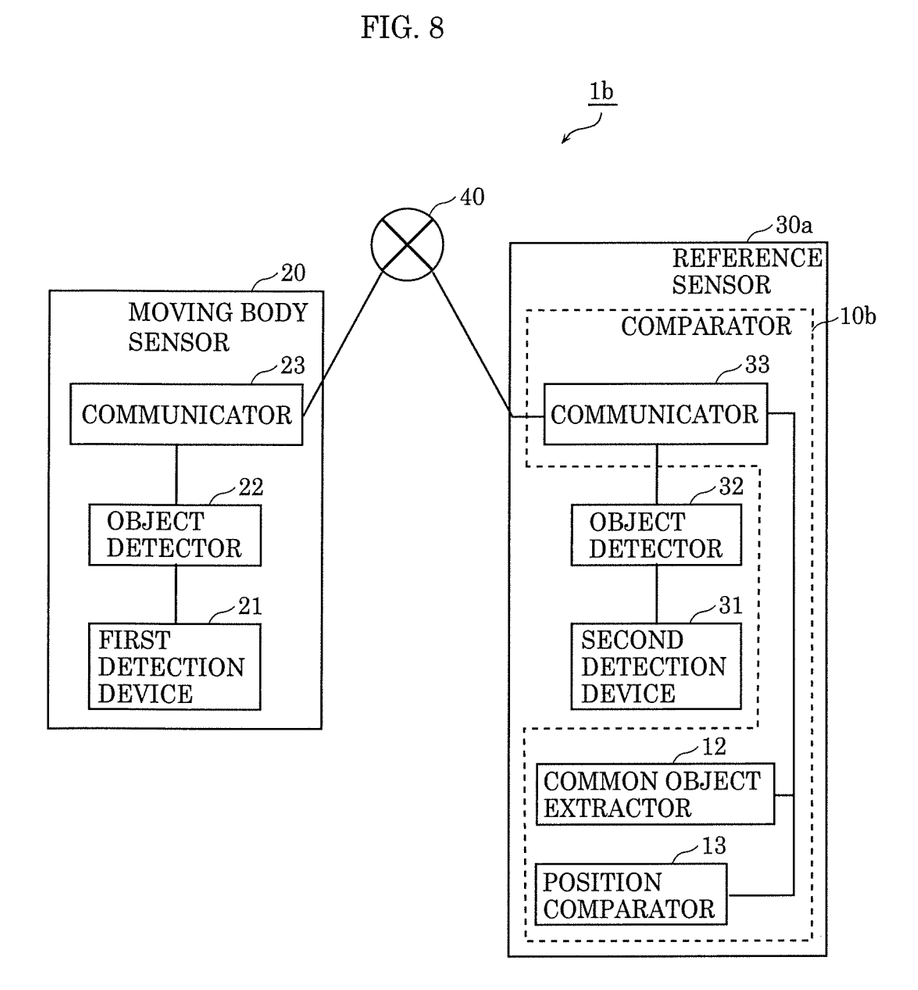
FIG. 8 is a block diagram showing a configuration of a determination system according to another variation.

As another example, as shown in FIG. 8, determination system 1b may include reference sensor 30a, moving body sensor 20, and network 40. Determination system 1b has the same or similar function as determination system 1 according to the embodiment. Reference sensor 30a includes comparator 10b with the same or similar function as comparator 10 according to the embodiment. Reference sensor 30a has the same or similar function as reference sensor 30 according to the embodiment.

(3) In the embodiment, determination system 1 may repeatedly extract the reference object to obtain one or more reference objects and register the positions of the one or more extracted reference objects in a database. In this case, determination system 1 may calculate the reliability of each of the one or more reference objects registered in the database, based on the frequency of extraction of the reference object. Determination system 1 may here calculate the reliabilities, for example, so that a reference object extracted more frequently has a higher reliability. In this case, determination system 1 may calculate the reliability of each of the one or more reference objects registered in the database, based on the location of another reference object near the reference object. Determination system 1 may here calculate the reliabilities, for example, so that a reference object in a location more suitable for a reference object has a higher reliability. In this case, determination system 1 may calculate the reliability of each of the one or more reference objects registered in the database based on the shape of the reference object. Determination system 1 may here calculate the reliabilities, for example, so that a reference object in a shape more suitable for a reference object has a higher reliability.

The reliabilities of the reference objects in this manner are applicable to the result of determination on whether first detection device 21 is operating normally.

Such register of the positions of the extracted reference objects in the database allows creation of a spot map indicating the spots in which the determination on whether first detection device 21 is operating normally is possible.

Determination system 1 may obtain, from a dynamic map, third information indicating whether each of the one or more extracted reference objects is a static object or a quasi-static object, and link the reference object with the third information. In this case, determination system 1 may calculate the reliability of each of the one or more extracted reference objects as follows. A reference object indicated as being the static object or the quasi-static object by the linked third information has a higher reliability than a reference object indicated as being neither the static object nor the quasi-static object by the linked third information. The static object or the quasi-static object is here an object (e.g., a road surface or a building) whose position does not change for a relatively long period (e.g., one month or more).

When it is determined that first detection device 21 is not operating normally, determination system 1 may selectively output a signal in accordance with the reliability of the reference object utilized for the determination. In this case, determination system 1 may selectively output, for example, any one of a signal for leaving an alert in the moving body, a signal for maintaining the moving body, and a signal for stopping the moving body.

Determination system 1 may output a signal for causing the moving body to travel periodically in an area including a reference object having a reliability higher than a predetermined value.

(4) In the embodiment, determination system 1 may extract a plurality of reference objects around the moving body. In this case, the extracted reference objects are located in directions different from each other as viewed from the moving body in one preferred embodiment. In particular, if there are three or more reference objects in directions different from each other, the position of the moving body on a plane can be calculated at a higher accuracy.

(5) In the embodiment, determination system 1 may calculate the reliability of the result of determination on whether first detection device 21 is operating normally, from at least one of the conditions of the moving body, the conditions of the reference object(s), the number of the reference object(s), and the direction(s) of the reference object(s).

(6) In determination system 1, a device being any single constituent element or including a combination of a plurality of constituent elements may be referred to as a "determination device". For example, comparator 10 may be referred to as a "determination device". For example, a device including comparator 10, communicator 23, object detector 22, communicator 33, and object detector 32 may be referred to as a "determination device". The determination device may include, for example, a plurality of physically separated parts.

(7) In the embodiment, the constituent elements of determination system 1 may be formed individually as single chips being semiconductor devices such as integrated circuits (ICs), large scale integrated (LSI) circuits. Alternatively, some of all of the constituent elements may be integrated into such a chip. The technique of circuit integration is not limited to the LSI but may be a dedicated circuit or a general-purpose processor. The IC may be a field-programmable gate array (FPGA) programmable after the production of the LSI circuit or a reconfigurable processor capable of reconfiguring the connections or settings of circuit cells inside the LSI circuit. In addition, if a circuit integration technique replacing the LSI appears with the development or derivation of the semiconductor technology, the technique may be used for integrating the functional blocks. Biotechnology is also applicable as an option.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is widely applicable to a system, for example, that determines whether a detection device is operating normally.

What is claimed is:

1. A determination method comprising:
    obtaining first information indicating positions and shapes of one or more objects detected by a first detection device, and second information indicating positions and shapes of one or more objects detected by a second detection device determined in advance as a reference detection device;
    extracting a reference object that is a common object from the one or more objects detected by the first detection device and the one or more objects detected by the second detection device based on the first information and the second information, the common object being detected by the first detection device and the second detection device with a time difference within a predetermined range;
    comparing a position of the reference object indicated by the first information to the position of the reference object indicated by the second information; and
    determining whether the first detection device is operating normally.

2. The determination method according to claim 1, wherein
    the first detection device is mounted on a moving body, and
    in the extracting of the reference object, the reference object is extracted from the one or more objects detected, by the first detection device, when the moving body moves at a first predetermined speed or lower.

3. The determination method according to claim 1, wherein
    the first detection device is mounted on a moving body, and
    in the extracting of the reference object, the reference object is extracted from the one or more objects detected, by the first detection device, when the moving body is stopped.

4. The determination method according to claim 1, wherein
    in the extracting of the reference object, a stationary object is extracted as the reference object.

5. The determination method according to claim 1, wherein
    in the extracting of the reference object, an object moving at a second predetermined speed or lower is extracted as the reference object.

6. The determination method according to claim 1, wherein
    in the extracting of the reference object, one or more objects in a predetermined shape are extracted as reference objects each being the reference object.

7. The determination method according to claim 6, wherein
    the one or more objects in the predetermined shape are long objects.

8. The determination method according to claim 1, wherein
    the first detection device is mounted on a moving body, and
    in the determining, when it is determined that the first detection device is not operating normally, a signal for stopping the moving body is output.

9. The determination method according to claim 1, wherein
    in the determining, when it is determined that the first detection device is not operating normally, a signal for starting calibration related to the first detection device is output.

10. The determination method according to claim 1, further comprising:
    repeatedly extracting the reference object;
    registering, in a database a position of each of the one or more reference objects extracted; and
    calculating a reliability of each of the one or more reference objects registered in the database, based on at least one of a frequency of extraction of the reference object and a location of another reference object near the reference object.

11. The determination method according to claim 10, wherein
    the first detection device is mounted on a moving body, and
    in the determining, when it is determined that the first detection device is not operating normally, any one of a signal for leaving an alert in the moving body, a signal for maintaining the moving body, and a signal for stopping the moving body is selectively output in accordance with the reliability of the reference object utilized for the determination.

12. The determination method according to claim 10, wherein
the first detection device is mounted on a moving body, and
a signal is output which is for causing the moving body to travel periodically in an area including a reference object having a reliability higher than a predetermined value.

13. The determination method according to claim 1, further comprising:
repeatedly extracting the reference object;
obtaining, from a dynamic map, third information indicating whether each of the one or more reference objects extracted is a static object or a quasi-static object, and linking the reference object with the third information; and
calculating a reliability of each of the one or more reference objects extracted such that a reference object indicated as being the static object or the quasi-static object by the third information linked has a higher reliability than a reference object indicated as being neither the static object nor the quasi-static object by the third information linked.

14. The determination method according to claim 13, wherein
the first detection device is mounted on a moving body, and
in the determining, when it is determined that the first detection device is not operating normally, any one of a signal for leaving an alert in the moving body, a signal for maintaining the moving body, and a signal for stopping the moving body is selectively output in accordance with the reliability of the reference object utilized for the determination.

15. The determination method according to claim 13, wherein
the first detection device is mounted on a moving body, and
a signal is output which is for causing the moving body to travel periodically in an area including a reference object having a reliability higher than a predetermined value.

16. A determination device comprising:
an obtainer that obtains first information indicating positions and shapes of one or more objects detected by a first detection device, and second information indicating positions and shapes of one or more objects detected by a second detection device determined in advance as a reference detection device;
an extractor that extracts a reference object that is a common object from the one or more objects detected by the first detection device and the one or more objects detected by the second detection device based on the first information and the second information, the common object being detected by the first detection device and the second detection device with a time difference within a predetermined range; and
a comparator that compares a position of the reference object indicated by the first information to the position of the reference object indicated by the second information to determine whether the first detection device is operating normally.

\* \* \* \* \*